US008648848B2

(12) United States Patent
Tsai et al.

(10) Patent No.: US 8,648,848 B2
(45) Date of Patent: Feb. 11, 2014

(54) DISPLAY DEVICE AND DISPLAYING METHOD THEREOF, AND DRIVING CIRCUIT FOR CURRENT-DRIVEN DEVICE

(75) Inventors: Tsung-Ting Tsai, Hsin-Chu (TW); Lee-Hsun Chang, Hsin-Chu (TW)

(73) Assignee: Au Optronics Corp., Hsinchu (TW)

(*) Notice: Subject to any disclaimer, the term of this patent is extended or adjusted under 35 U.S.C. 154(b) by 482 days.

(21) Appl. No.: 12/853,598

(22) Filed: Aug. 10, 2010

(65) Prior Publication Data

US 2011/0279435 A1 Nov. 17, 2011

(30) Foreign Application Priority Data

May 12, 2010 (TW) ............................. 099115176 A

(51) Int. Cl.

| | |
|---|---|
| ***G06F 3/038*** | (2013.01) |
| ***G09G 3/30*** | (2006.01) |
| ***G09G 3/36*** | (2006.01) |
| ***G06F 3/02*** | (2006.01) |

(52) U.S. Cl.

USPC ................. 345/212; 345/80; 345/89; 345/97; 345/169

(58) Field of Classification Search

USPC ............... 345/76–83, 99–100, 204, 214, 215, 345/212; 315/169.1–169.4

See application file for complete search history.

(56) References Cited

U.S. PATENT DOCUMENTS

| | | | | |
|---|---|---|---|---|
| 4,770,502 | A * | 9/1988 | Kitazima et al. | 345/97 |
| 5,353,041 | A * | 10/1994 | Miyamoto et al. | 345/97 |
| 6,501,466 | B1 * | 12/2002 | Yamagishi et al. | 345/204 |
| 6,603,456 | B1 * | 8/2003 | Aoki et al. | 345/100 |
| 6,859,193 | B1 * | 2/2005 | Yumoto | 345/82 |
| 6,949,884 | B2 * | 9/2005 | Shih et al. | 315/169.3 |
| 7,508,365 | B2 * | 3/2009 | Kim | 345/76 |
| 7,639,211 | B2 * | 12/2009 | Miyazawa | 345/39 |
| 7,656,369 | B2 * | 2/2010 | Chung et al. | 345/80 |
| 7,800,561 | B2 * | 9/2010 | Asano | 345/77 |
| 2001/0045929 | A1 * | 11/2001 | Prache et al. | 345/89 |
| 2002/0171611 | A1 * | 11/2002 | Cok | 345/82 |
| 2004/0196222 | A1 * | 10/2004 | Shih et al. | 345/82 |
| 2004/0207615 | A1 * | 10/2004 | Yumoto | 345/211 |
| 2005/0073490 | A1 * | 4/2005 | Kojima et al. | 345/87 |
| 2005/0105031 | A1 * | 5/2005 | Shih et al. | 349/139 |
| 2005/0190177 | A1 * | 9/2005 | Yumoto | 345/211 |
| 2005/0200300 | A1 * | 9/2005 | Yumoto | 315/169.1 |
| 2007/0040769 | A1 * | 2/2007 | Tai et al. | 345/76 |
| 2007/0236440 | A1 * | 10/2007 | Wacyk et al. | 345/92 |
| 2008/0062088 | A1 * | 3/2008 | Chang et al. | 345/76 |
| 2008/0111804 | A1 * | 5/2008 | Choi et al. | 345/205 |
| 2009/0146987 | A1 * | 6/2009 | Kim et al. | 345/212 |
| 2010/0066726 | A1 * | 3/2010 | Kim et al. | 345/214 |
| 2011/0279435 | A1 * | 11/2011 | Tsai et al. | 345/212 |

* cited by examiner

*Primary Examiner* — Dwayne Bost
*Assistant Examiner* — Scott Trandai
(74) *Attorney, Agent, or Firm* — WPAT, PC; Justin King

(57) ABSTRACT

The present invention provides a display device, a displaying method thereof and a driving circuit for current-driven device. Each pixel of the display device includes a current-driven device and a driving circuit. A first terminal of the current-driven device is electrically coupled to a first preset voltage. The driving circuit includes a switch module and a capacitor. The switch module is electrically coupled to a data signal, a second terminal of the current-driven device and a second preset voltage. The switch module is for determining whether a current is allowed to flow through the current-driven device and setting a value of the current according to the data signal. The capacitor is electrically coupled between a periodically changed resetting signal and the switch module, to couple the resetting signal into the switch module to reset a voltage at a connection node between the capacitor and the switch module.

26 Claims, 15 Drawing Sheets

DISPLAY DEVICE AND DISPLAYING METHOD THEREOF, AND DRIVING CIRCUIT FOR CURRENT-DRIVEN DEVICE

BACKGROUND

1. Technical Field

The present invention generally relates to fields of display technology and, particularly to a display device, a displaying method, and a driving circuit for a current-driven device.

2. Description of the Related Art

In each pixel of organic light emitting diode (OLED) display devices, charges are generally stored in a capacitor operative with transistors to control brightness of an OLED. The OLED is a kind of current-driven device and can emit lights with different brightness according to values of currents flowing therethrough. Referring to FIG. 1A, showing a circuit diagram of a traditional pixel. The pixel 10 includes a driving circuit 12 and an OLED 16. The driving circuit 12 is for controlling the brightness of the OLED 16 and has a structure of two-transistor-one-capacitor (2T1C). In detail, the driving circuit 12 includes two transistors M1, M2 and a capacitor C1. The transistors M1 and M2 respectively are N-type and P-type. A drain of the transistor M1 is electrically coupled to a data line DL, and a gate of the transistor M1 is controlled by a control signal SCAN to determine whether a data signal on the data line DL is transferred to a source of the transistor M1. A gate of the transistor M2 is electrically coupled to the source of the transistor M1, a source of the transistor M2 is electrically coupled to a power supply voltage OVDD and a drain of the transistor M2 is electrically coupled to an anode of the OLED 16. A cathode of the OLED 16 is electrically coupled to another power supply voltage OVSS. The capacitor C1 is electrically coupled between the gate and the source of the transistor M2.

Referring to FIG. 1B, there is hysteresis effect in the transistor M2. When a gate-source voltage $V_G$ of the transistor M2 generated according to a data signal latterly written into the pixel 10 is greater than another gate-source voltage $V_B$ of the transistor M2 generated according to another data signal formerly written into the pixel 10, a value of the current flowing through the OLED 16 of the pixel 10 (i.e., generally a drain-source current Ids of the transistor M2) changes from $I_B$ (corresponding to a gray scale value such as gray scale 0 of displaying a black image) to $I_{G1}$, that is, changes along a voltage-current characteristic curve (I-V curve) represented by the "S" shaped dotted line. When the gate-source voltage $V_G$ of the transistor M2 generated according to the data signal latterly written into the pixel 10 is less than a gate-source voltage Vw of the transistor M2 generated according to the data signal formerly written into the pixel 10, the value of the current flowing through the OLED 16 of the pixel 10 changes from Iw (corresponding to a gray scale value such as gray scale 255 of displaying a white image) to $I_{G2}$, that is, changes along a voltage-current characteristic curve (I-V curve) represented by the "S" shaped solid line. In other words, when data signals latterly written into the pixel 10 are the same, currents generated according to the latterly written data signals are different because of the different relative relationships of the data signals latterly written into the pixel 10 and the respective data signals formerly written into the pixel 10, thereby displaying different gray scales. Therefore, as there is hysteresis effect in the transistor of the above-mentioned traditional pixel, an image retention phenomenon may be caused along with the display changing from a high gray scale image to a low gray scale image, thereby affecting the display quality.

SUMMARY

Accordingly, the present invention is directed to a display device, for suppressing the issue of image retention associated with the prior art and thereby improving the display quality.

The present invention is further directed to a displaying method, for suppressing the issue of image retention in the prior art and thereby improving the display quality.

The present invention is still further directed to a driving circuit for a current driven device, so as to compensate the hysteresis effect of switch element such as transistor.

Specifically, a display device in accordance with an embodiment of the present invention includes a plurality of pixels, and each of the pixels includes a light emitting diode (LED) and a driving circuit. The LED includes a first terminal and a second terminal. The first terminal of the LED is electrically coupled to a first preset voltage. The driving circuit includes a first switch, a second switch and a capacitor. A first passage terminal of the first switch is electrically coupled to receive a data signal, and a control terminal of the first switch is electrically coupled to receive a scanning signal to determine whether the data signal is allowed to be transferred from the first passage terminal of the first switch to the second passage terminal of the first switch. A first passage terminal of the second switch is electrically coupled to the second terminal of the LED, a second passage terminal of the second switch is electrically coupled to a second preset voltage, and a control terminal of the second switch is electrically coupled to the second passage terminal of the first switch to receive the data signal. The capacitor is electrically coupled between a periodically changed/varied resetting signal and the control terminal of the second switch. Furthermore, a voltage of the control terminal of the second switch is reset by the resetting signal during the first switch is turned off.

In one embodiment of the present invention, the above-mentioned plurality of pixels respectively are written with data signals during being sequentially enabled by scanning signals in a frequency period. In each adjacent two of the pixels, a voltage of the control terminal of the second switch of the latterly enabled pixel is reset during the formerly enabled pixel being written with the data signal. Furthermore, the frequency period includes a data writing time period and a blanking time period, each of the plurality of pixels is enabled by the scanning signal in the data writing time period, and the voltage of the control terminal of the second switch of each of the plurality of pixels is reset in the blanking time period.

In one embodiment of the present invention, in each adjacent two of the pixels, the voltage of the control terminal of the second switch of the latterly enabled pixel is further reset to a first voltage level during the formerly enabled pixel being written with the data signal, and the voltage of the control terminal of the second switch of each of the plurality of pixels is reset to a second voltage level in the blanking time period. The first voltage level is the same as or different from the second voltage level. In the situation of the first voltage level being different from the second voltage level, the first voltage level can be higher than the second voltage level, or the first voltage level is lower than the second voltage level instead.

In one embodiment of the present invention, the above-mentioned plurality of pixels respectively are written with the data signals during being sequentially enabled by the scanning signals in a frequency period. The frequency period includes a data writing time period and a blanking time period, each of the pixels is enabled by the scanning signal in the data writing time period, and the voltage of the control terminal of the second switch of each of the pixels is reset in the blanking time period. Furthermore, in each two adjacent the frequency periods, the voltage of the control terminal of the second switch of each of the plurality of pixels is reset to a first voltage level in the blanking period of a first frequency period of the two adjacent frequency periods, the voltage of the control terminal of the second switch of each of the plurality of pixels is reset to a second voltage level in the blanking time period of a second frequency period of the two adjacent frequency periods, and the first voltage level is different from the second voltage level. In another embodiment, the voltage of the control terminal of the second switch of each of the plurality of pixels is reset several times in the blanking time period.

In one embodiment of the present invention, the above-mentioned first switch and second switch are transistors, and conductive types of the transistors are the same as each other or different from each other.

A displaying method in accordance with another embodiment of the present invention is adapted for being applied to a display device. Herein, the display device includes a plurality of pixels, and each of the plurality of pixels includes a light emitting diode (LED), a switch module and a capacitor. A first terminal of the LED is electrically coupled to a first preset voltage. The switch module is electrically coupled to a data signal, a second terminal of the LED and a second preset voltage. The switch module is for determining whether a current is allowed to flow through the LED and setting a value of the current flowing through the LED according to the data signal. A terminal of the capacitor is electrically coupled to the switch module and whereby forming a connection node. In particular, the displaying method includes the following step of: in a frequency period of the display device, sequentially scanning the plurality of pixels to enable the switch module of each of the plurality of pixels and thereby writing the data signal into the pixel; and during the switch module of each of the plurality of pixels is not enabled, coupling a periodically changed/varied resetting signal to the switch module of the pixel through the capacitor of the pixel to reset a voltage of the connection node of the pixel.

In one embodiment of the present invention, in the above-mentioned displaying method, in each adjacent two of the pixels, the voltage of the connection node of the pixel of latterly written with the data signal is reset during the pixel of formerly written with the data signal being written with the data signal. Furthermore, the frequency period includes a data writing time period and a blanking time period, the switch module of each of the plurality of pixels is enabled in the data writing time period, and the voltage of the connection node of each of the plurality of pixels is reset in the blanking time period.

In one embodiment of the present invention, in the above-mentioned displaying method, in each adjacent two of the pixels, the voltage of the connection node of pixel of latterly written with the data signal is reset to a first voltage level during the pixel of formerly written with the data signal being written with the data signal. The voltage of the connection node of each of the plurality of pixels is reset to a second voltage level in the blanking time period. The first voltage level is the same as or different from the second voltage level. In the circumstance of the first voltage level being different from the second voltage level, the first voltage level can be lower than the second voltage level, or the first voltage level is higher than the second voltage level instead.

In one embodiment of the present invention, in the above-mentioned displaying method, the frequency period includes a data writing time period and a blanking time period. The switch module of each of the plurality of pixels is enabled in the data writing time period, and the voltage of the connection node of each of the plurality of pixels is reset in the blanking time period. Moreover, in each two adjacent the frequency periods, the voltage of the connection node of each of the pixels is reset to a first voltage level in the blanking time period of a first frequency period of the two adjacent frequency periods, the voltage of the connection node of each of the pixels is reset to a second voltage level in the blanking time period of a second frequency period of the two adjacent frequency periods, and the first voltage level is different from the second voltage level. In another embodiment, the voltage of the connection node of each of the pixels is reset multiple times in the blanking time period.

A driving circuit in accordance with still another embodiment of the present invention is adapted to drive a current-driven device. The current-driven device includes a first terminal and a second terminal, and the first terminal of the current-driven device is electrically coupled to a first preset voltage. The driving circuit includes a switch module and a capacitor. The switch module is electrically coupled to a data signal, the second terminal of the current-driven component and a second preset voltage. The switch module is for determining whether a current is allowed to flow through the current-driven device and setting a value of the current flowing through the current-driven device according to the data signal. The capacitor is electrically coupled between a periodically changed/varied resetting signal and the switch module and for coupling the resetting signal into the switch module to reset a voltage at a connection node between the capacitor and the switch module.

In one embodiment of the present invention, the above-mentioned switch module includes a plurality of switches, and each of the plurality of switches includes a control terminal, a first passage terminal and a second passage terminal. In particular, the switch module includes a first switch and a second switch. The first passage terminal of the first switch is electrically coupled to receive a data signal, and the control terminal of the first switch is electrically coupled to receive a scanning signal to determine whether the data signal is allowed to be transferred from the first passage terminal of the first switch to the second passage terminal of the first switch. The first passage terminal of the second switch is electrically coupled to the second terminal of the current-driven device, the second passage terminal of the second switch is electrically coupled to the second preset voltage, and the control terminal of the second switch is electrically coupled to the second passage terminal of the first switch to receive the data signal. Moreover, the capacitor is electrically coupled between the resetting signal and the control terminal of the second switch.

In one embodiment of the present invention, each of the first switch and the second switch of the above-mentioned driving circuit is one of an N-type transistor and a P-type transistor.

In one embodiment of the present invention, the above-mentioned current-driven device is an organic LED.

In various embodiments of the present invention, the periodically changed resetting signal is provided and then coupled to the driving circuit through the capacitor during the first switch being turned off, to perform the reset operation for carrying out black insertion and/or white insertion operations, so that the current of the second switch such as a transistor electronically coupled to the current-driven device (e.g., OLED) of the driving circuit rises or falls only along a single current-voltage characteristic curve when various different data signals are written and thereby compensating the inherent hysteresis effect of the transistor. Furthermore, when such the driving circuit is applied to the pixels of the display device, the issue of image retention in the prior art can be effectively suppressed thereby improving the display quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following detailed description of the preferred embodiments, reference is made to the accompanying drawings which form a part hereof, and in which are shown by way of illustration specific embodiments in which the invention may be practiced. It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Accordingly, the descriptions will be regarded as illustrative in nature and not as restrictive.

Figure 2:
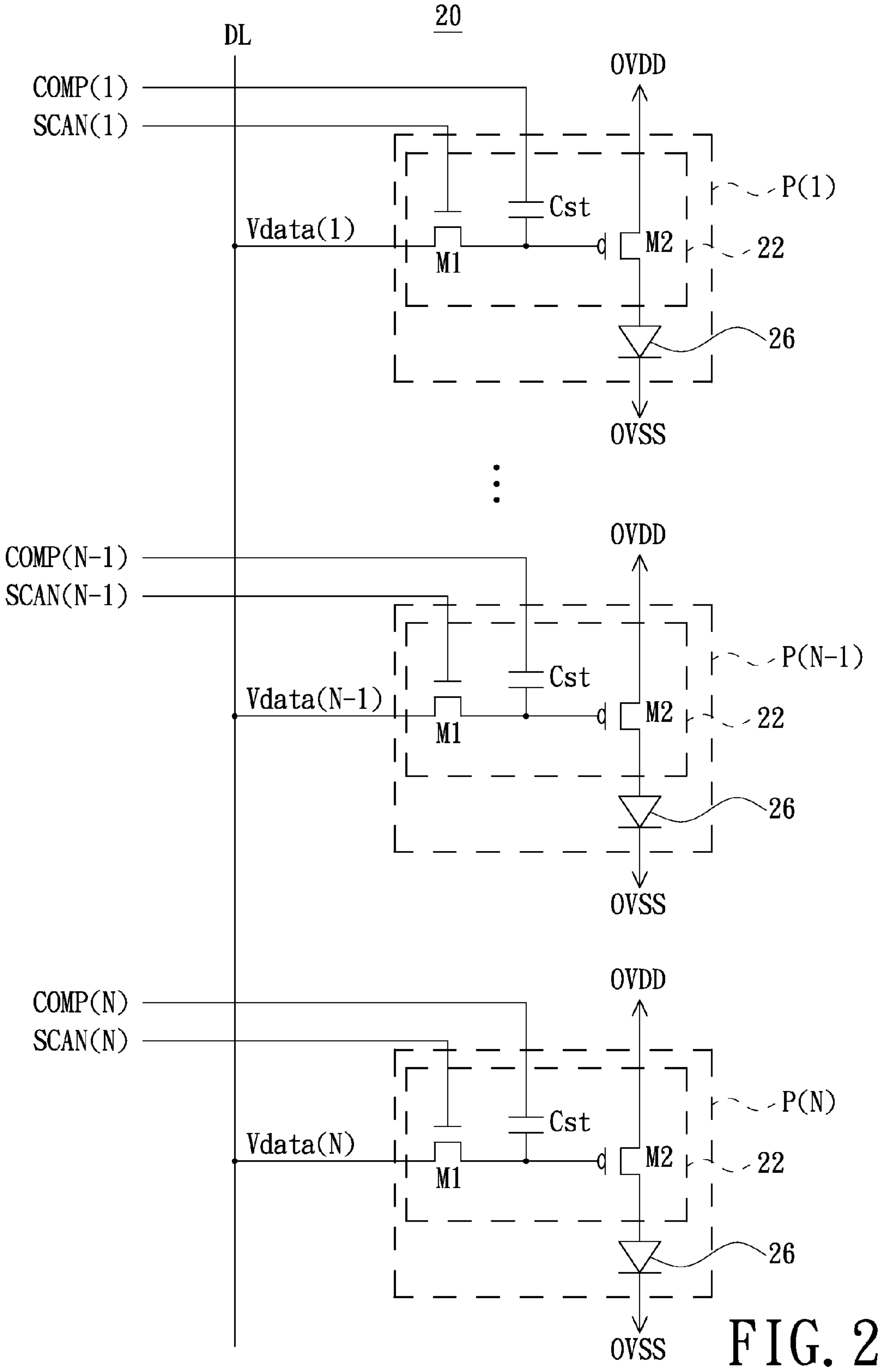
FIG. 2 shows a schematic partial view of an exemplary embodiment of a display device.

Referring to FIG. 2, showing a schematic partial view of a display device in accordance with an exemplary embodiment of the present invention. As illustrated in FIG. 2, the display device 20 includes a plurality of pixels P (1)~P (N). The pixels P (1)~P (N) are sequentially enabled by scanning signals SCAN (1)~SCAN (N) in a frequency period e.g., frame period of the display device 20 and thereby respectively are allowed to receive and be written with data signals Vdata (1)~Vdata (N) from the data line DL. Furthermore, the pixels P (1)~P (N) respectively receive periodically varied resetting signals COMP (1)~COMP (N), where N is a positive integer greater than 1. It is indicated that, FIG. 2 only shows one column of pixels by way of example, but does not limit the present invention. Specifically, each of the pixels P (1)~P (N) includes a driving circuit 22 and a current-driven device such as an OLED 26. In detail, the driving circuit 22 has a structure of two-transistor-one-capacitor (2T1C) and includes two transistors M1, M2 and a capacitor Cst. In this embodiment, the transistor M1 is an N-type transistor, and the transistor M2 is a P-type transistor. The transistors M1 and M2 serve as switches, and thus a gate, a drain and a source of each the transistor M1 and M2 respectively can act as a control terminal, a first passage terminal and a second passage terminal of each the switch. The transistors M1 and M2 cooperatively constitute a switch module for determining whether a current is allowed to flow through the OLED 26.

More specifically, the drain of the transistor M1 is electrically coupled to the data line DL to receive a corresponding one of the data signals Vdata (1)~Vdata (N), and the gate of the transistor M1 is electrically coupled to receive a corresponding one of the scanning signals SCAN (1)~SCAN (N) to determine whether the corresponding data signal is allowed to be transferred from the drain of the transistor M1 to the source of the transistor M1. The drain of the transistor M2 is electrically coupled to an anode of the OLED 26, a cathode of the OLED 26 is electrically coupled to a preset voltage such as a power supply voltage OVSS, the source of the transistor M2 is electrically coupled to another preset voltage such as a power supply voltage OVDD, and the gate of the transistor M2 is electrically coupled to the source of the transistor M1. A terminal of the capacitor Cst is electrically coupled to the gate of the transistor M2, and another terminal of the capacitor Cst is electrically coupled to receive a corresponding one of the resetting signals COMP (1)~COMP (N) and for coupling the corresponding resetting signal into the driving circuit 22 to reset a voltage of the gate of the transistor M2, that is, the voltage of a connection node between the capacitor Cst and the switch module.

Figure 3:
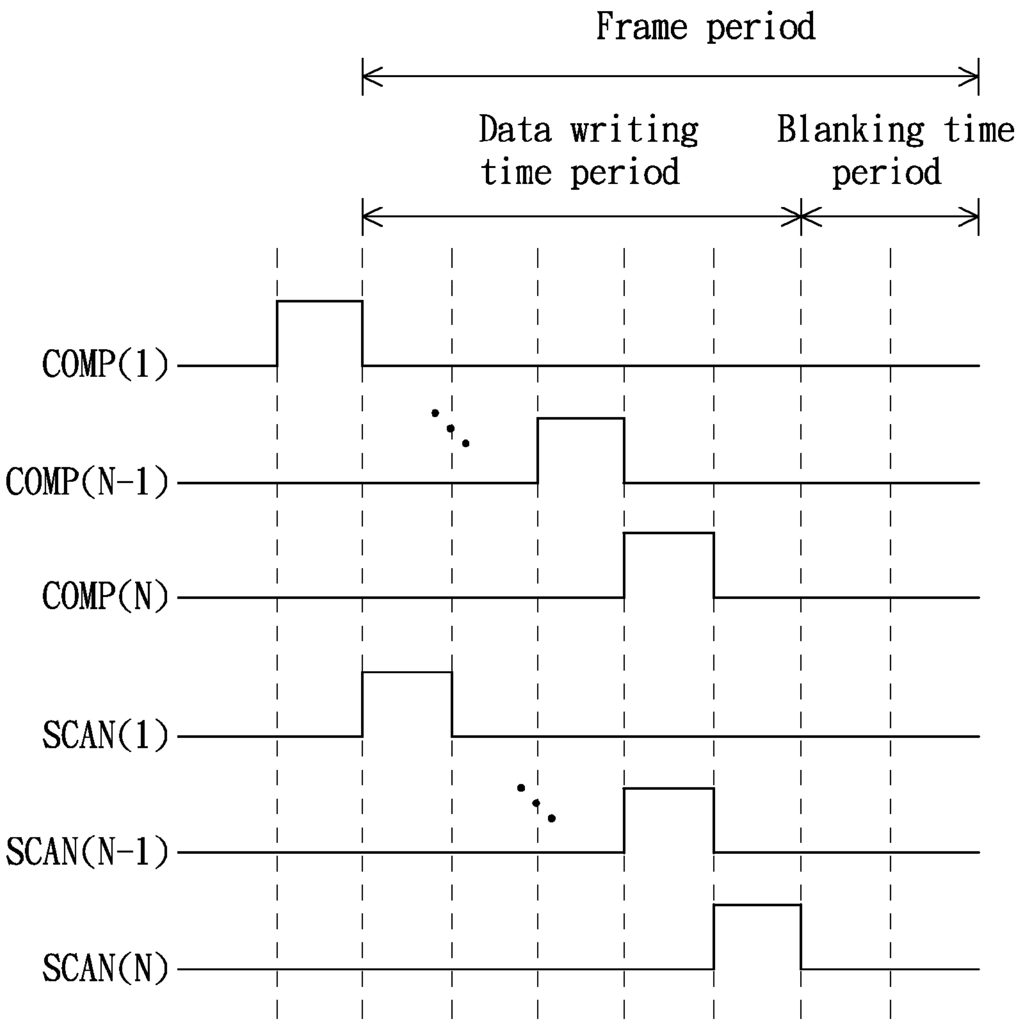
FIG. 3 shows timing diagrams of a first exemplary embodiment of resetting signals and scanning signals of a driving circuit of each pixel of FIG. 2.

The following depicts a reset operation of the voltage of the gate of the transistor M2 of the driving circuit 22 in combination with FIGS. 2 and 3. FIG. 3 shows timing diagrams of the resetting signals COMP (1)~COMP (N) and the scanning signals SCAN (1)~SCAN (N) of the driving circuit 22 of each of the pixels P (1)~P (N) of FIG. 2.

As illustrated in FIG. 3, a single frame period of the display device 20 includes a data writing time period and a blanking time period. In the data writing time period, the pixels P (1)~P (N) are enabled during the scanning signals SCAN (1)~SCAN (N) are sequentially at a logic high level, the transistors M1 in the respective pixels P (1)~P (N) are sequentially turned on to transfer the data signals Vdata (1)~Vdata (N) to the gates of the transistors M2 for data writing. When the scanning signals SCAN (1)~SCAN (N) sequentially changes to be a logic low level, the transistors M1 of the pixels P (1)~P (N) are sequentially turned off, which is representative of current data signals of the respective pixels have been written; thereafter the transistor M2 of each the pixel can drive the OLED 26 to produce a light with corresponding gray scale brightness according to the written data signal. In the blanking time period, scanning signals SCAN (1)~SCAN (N) are all at the logic low level, the transistor M1 of each of the pixels P (1)~P (N) is turned off, and the OLED 26 operates at a light emission stage.

It also can be found from FIG. 3 that: in each adjacent two of the pixels P(1)~(N), taking pixels P (N−1) and P (N) as an example for the purpose of illustration, the voltage of the gate of the transistor M2 of latterly enabled pixel P (N) is reset by the resetting signal COMP (N) during formerly enabled pixel P (N−1) being written with the data signal Vdata (N−1). In detail, when the formerly enabled pixel P (N−1) is written with the data signal Vdata (N−1), the transistor M1 of the pixel P (N) is turned off, the resetting signal COMP (N) changes to be a logic high level and then is coupled to the gate of the transistor M2 of the pixel P (N) through the capacitor Cst to reset the gate of the transistor M2 to be a logic high level. The transistor M2 is turned off, that is, performing a black insertion operation. In this embodiment, each of the pixels P (1)~P (N) is reset to an extreme black display state such as gray scale 0 during the pixel is disabled to be written with the corresponding data signal.

Figure 3A:
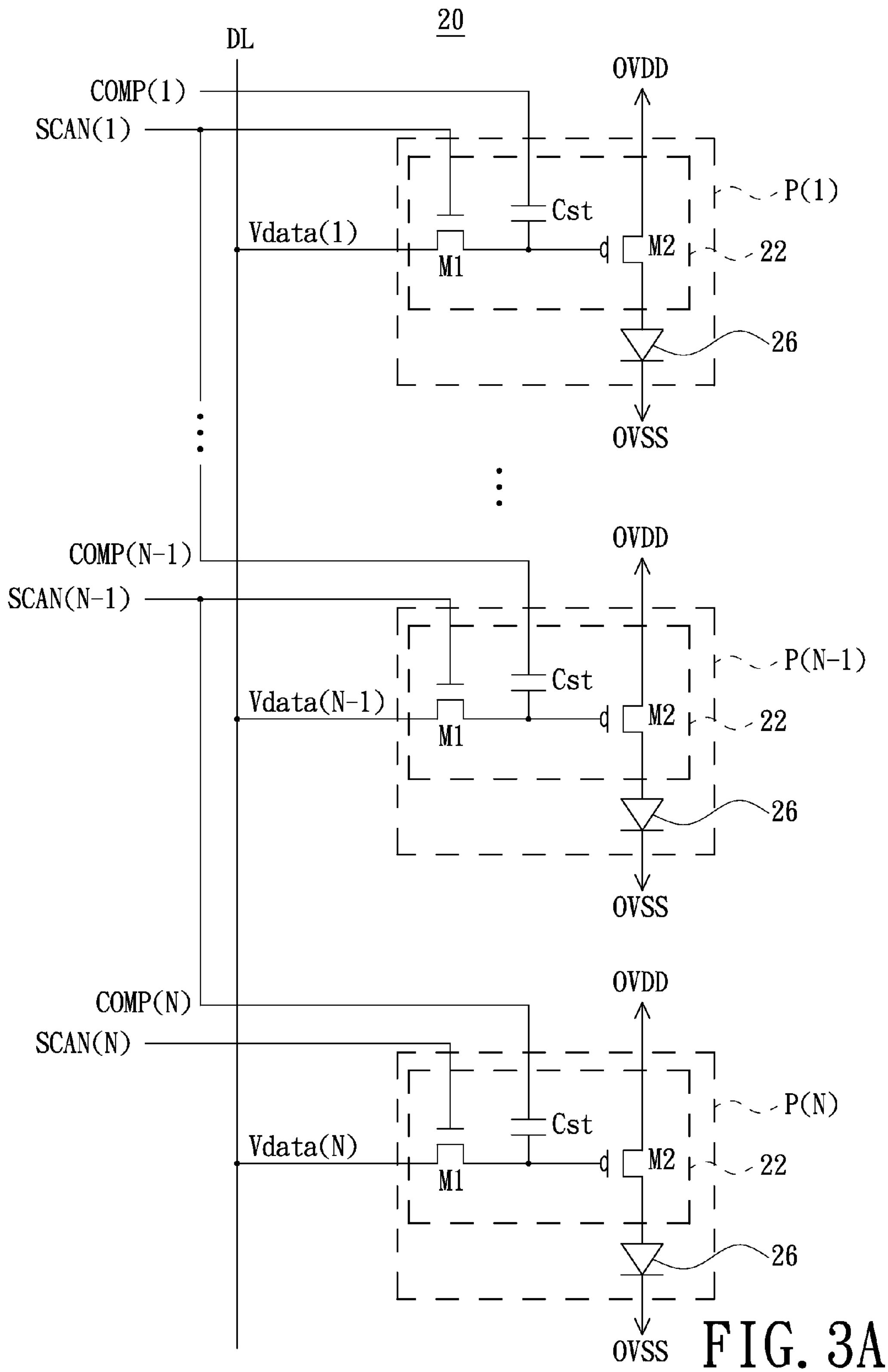
FIG. 3A shows a schematic partial view a display device relevant to the timing diagrams of FIG. 3.

In addition, according to waveform relationships between the resetting signals COMP (1)~COMP (N) and the scanning signals SCAN (1)~SCAN (N) as shown in FIG. 3, the scanning signal SCAN (N−1) of a former pixel e.g., P(N−1) can serve as the resetting signal COMP (N) of a latter pixel e.g., P (N) in the same column. Detailed circuit connection relationships can refer to the illustration of FIG. 3A.

It is noted that, the reset operation for the voltage of the gate of the transistor M2 of each of the pixels P (1)~P (N) is not limited to the situation as shown in FIG. 3 that: in each adjacent two of the pixels, the voltage of the gate of the transistor M2 of the latterly enabled pixel is reset during the formerly enabled pixel being written with the data signal, other situations such as the illustrations of FIGS. 4 through 9 also can be adopted.

Figure 4:
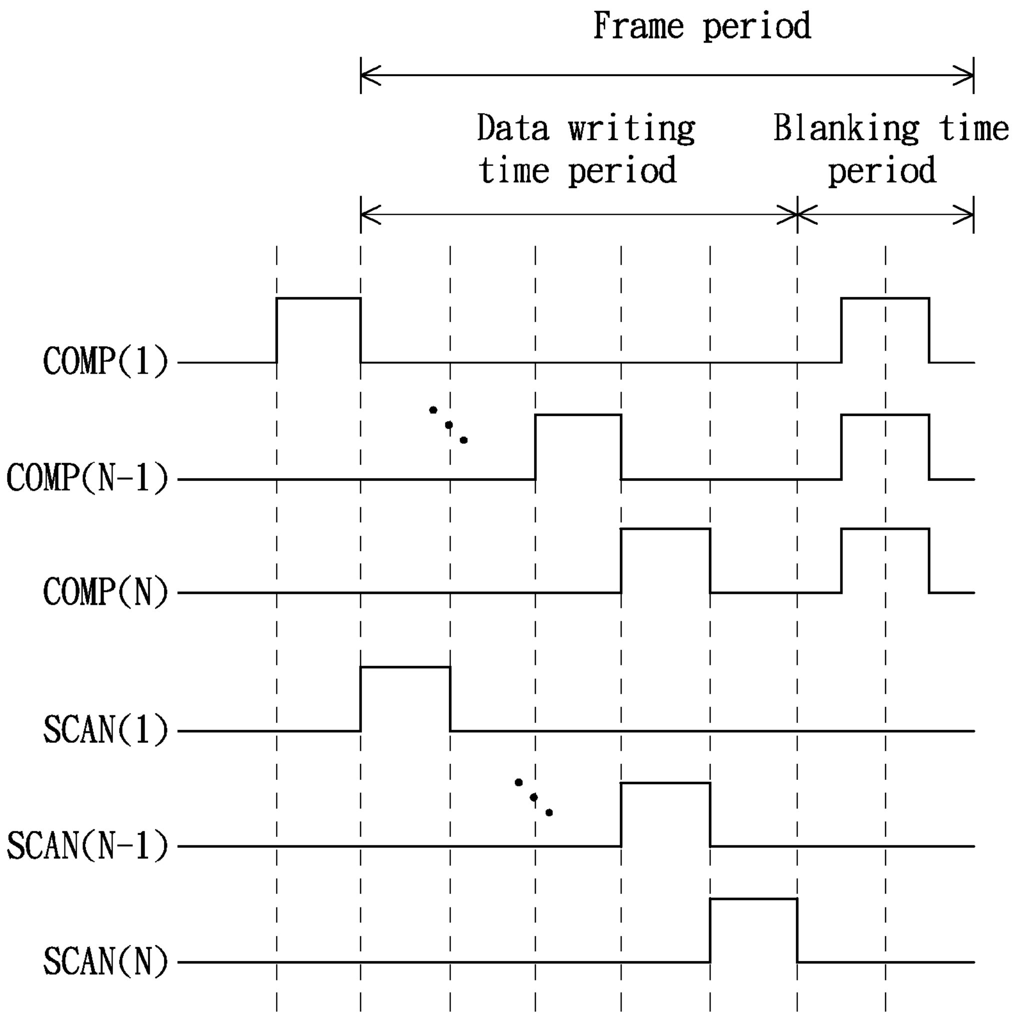
FIG. 4 shows timing diagrams of a second exemplary embodiment of resetting signals and scanning signals of a driving circuit of each pixel of FIG. 2.

Referring to FIG. 2 and FIG. 4 together, in each adjacent two of the pixels, such as the two adjacent pixels P (N−1) and P (N), the voltage of the gate of the transistor M2 of latterly enabled pixel P (N) is reset to be a logic high level during formerly enabled pixel P (N−1) being written with the data signal Vdata (N−1). Moreover, in the blanking time period of the frame period, each of the pixels P (1)~P (N) further is reset to be the logic high level when the corresponding one of the resetting signals COMP (1)~COMP (N) changes to be the logic high level again. In other words, as shown in FIG. 4, the voltage of the gate of the transistor M2 of each of the pixels P (1)~P (N) are reset to be the logic high level twice, to make the transistor M2 be turned off, that is, performing double black insertion operations.

Figure 5:
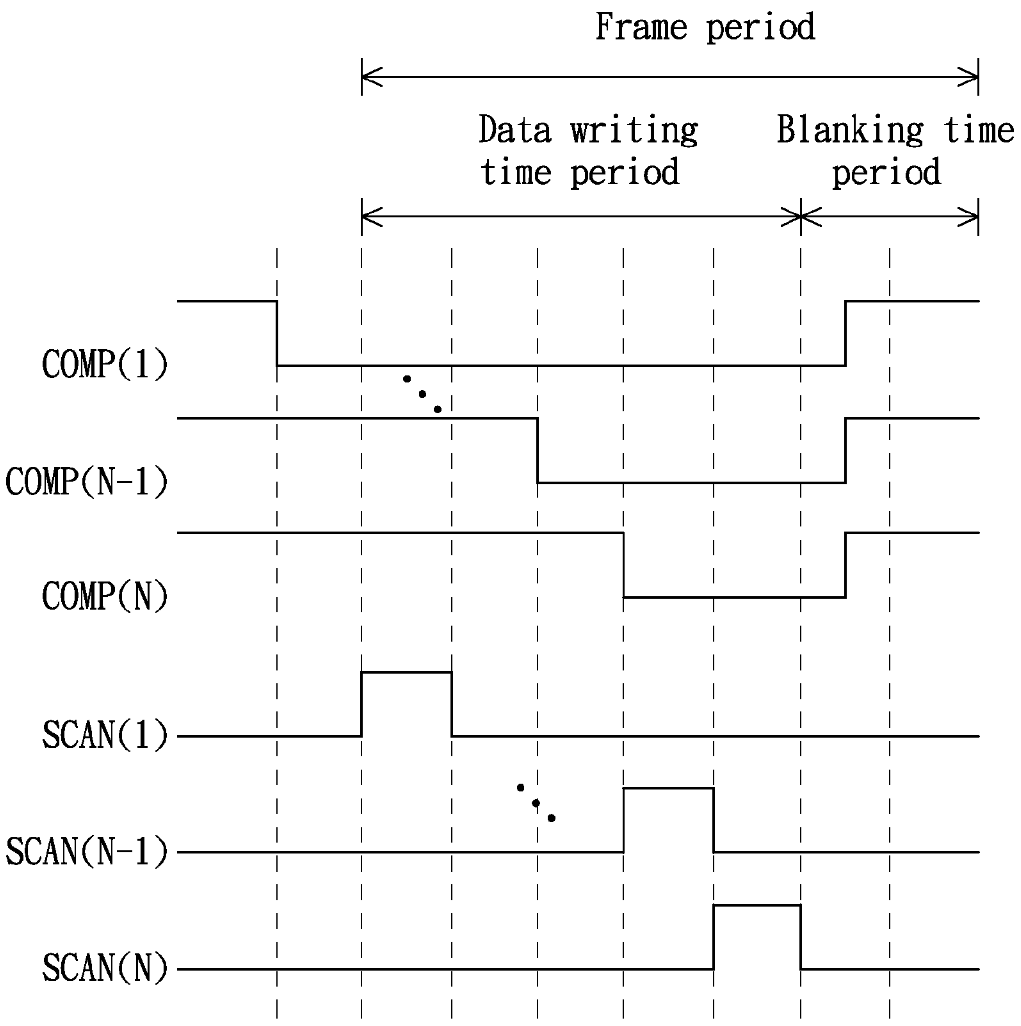
FIG. 5 shows timing diagrams of a third exemplary embodiment of resetting signals and scanning signals of a driving circuit of each pixel of FIG. 2.

Referring to FIG. 2 and FIG. 5 together, in each two adjacent pixels such as pixels P (N−1) and P (N), the voltage of the gate of the transistor M2 of latterly enabled pixel P (N) is reset to be a logic low level during formerly enabled pixel P (N−1) being written with the data signal Vdata (N−1). Moreover, in the blanking time period of the frame period, each of the pixels P (1)~P (N) is reset to be a logic high level when the corresponding one of the resetting signals COMP (1)~COMP (N) changes to be a logic high level. In other words, as shown in FIG. 4, the voltage of the gate of the transistor M2 of each of the pixels P (1)~P (N) is firstly reset to be a logic low level and secondly reset to be a logic high level, that is, performing former white insertion and latter black insertion operations. In this embodiment, each of the pixels P (1)~P (N) is firstly reset to an extreme white display state such as gray scale 255 and then reset to an extreme black display state such as gray scale 0 during the pixel is disabled to be written with the corresponding data signal.

Figure 6:
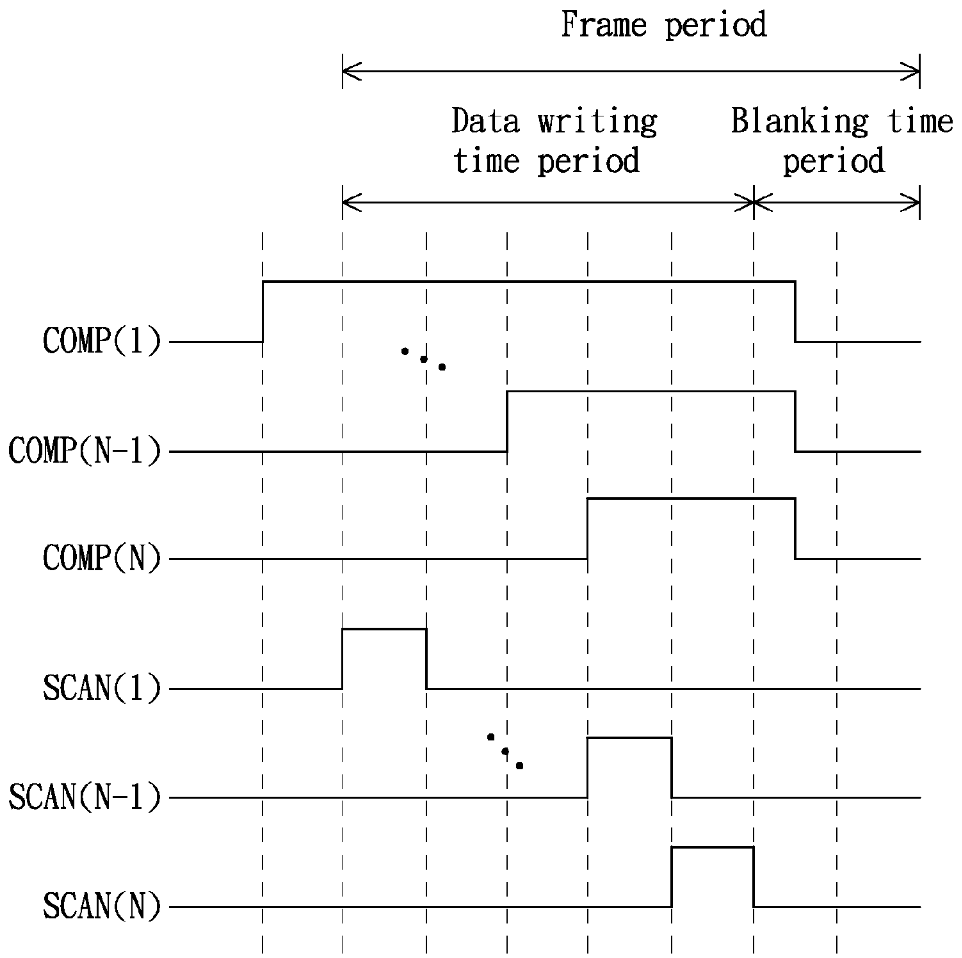
FIG. 6 shows timing diagrams of a fourth exemplary embodiment of resetting signals and scanning signals of a driving circuit of each pixel of FIG. 2.

Referring to FIG. 2 and FIG. 6 together, in each two adjacent pixels such as pixels P (N−1) and P (N), the voltage of the gate of the transistor M2 of latterly enabled pixel P (N) is reset to be a logic high level during formerly enabled pixel P (N−1) being written with the data signal Vdata (N−1). Moreover, in the blanking time period of the frame period, each of the pixels P (1)~P (N) is reset to be a logic low level when the corresponding one of the resetting signals COMP (1)~COMP (N) changes to be a logic low level. In other words, as shown in FIG. 6, the voltage of the gate of the transistor M2 of each of the pixels P (1)~P (N) is firstly reset to be a logic high level and secondly reset to be a logic low level, that is, performing former black insertion and latter white insertion operations. In this embodiment, each of the pixels P (1)~P (N) is firstly reset to an extreme black display state such as gray scale 0 and then reset to an extreme white display state such as gray scale 255 during the pixel is disabled to be written with the corresponding data signal.

Figure 7:
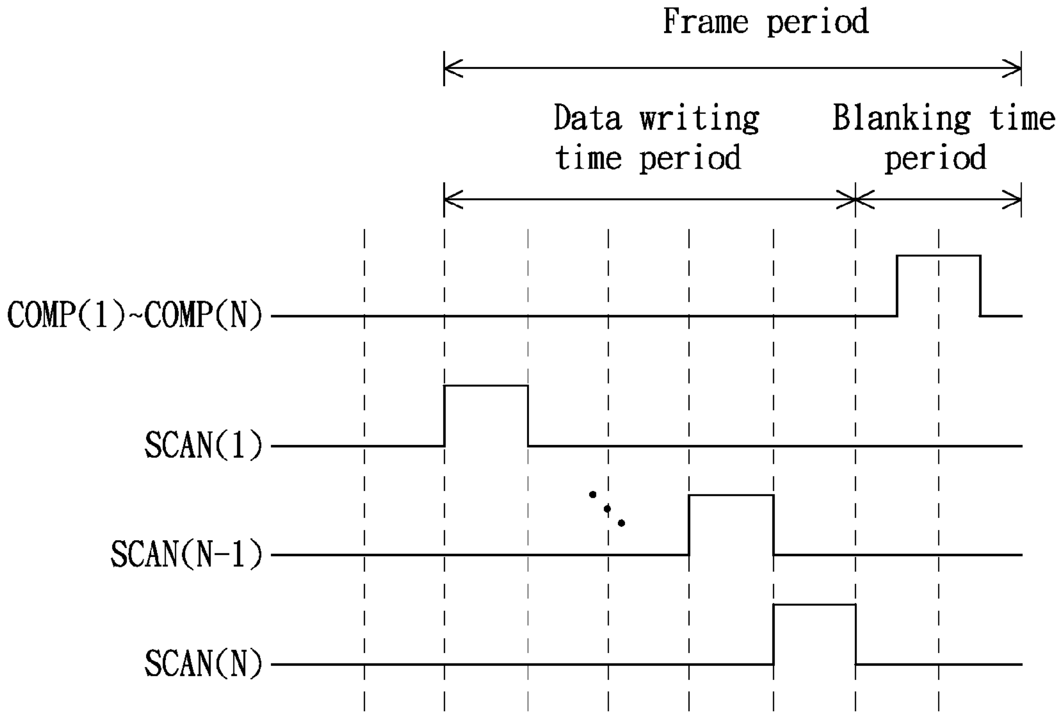
FIG. 7 shows timing diagrams of a fifth exemplary embodiment of resetting signals and scanning signals of a driving circuit of each pixel of FIG. 2.
Figure 7A:
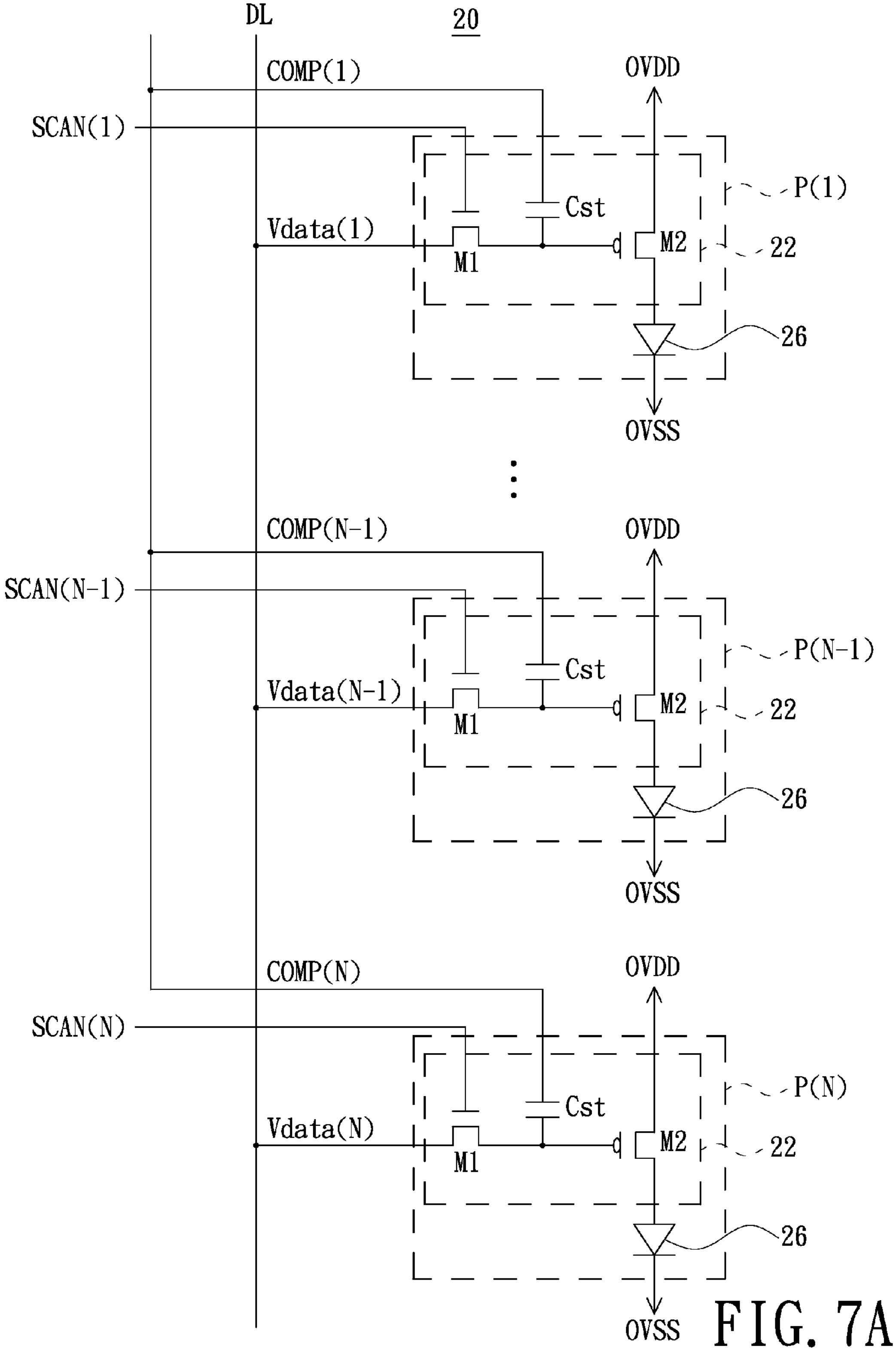
FIG. 7A shows a schematic partial view of a display device relevant to the timing diagrams of FIG. 7.

Referring to FIG. 2 and FIG. 7 together, each of the pixels P (1)~P (N) is reset only in the blanking time period of the frame period when the corresponding one of the resetting signals COMP (1)~COMP (N) changes to a logic high level. In detail, in FIG. 7, the resetting signals COMP (1)~COMP (N) of the respective pixels P (1)~P (N) have the same waveform. Therefore, terminals of the capacitors Cst of the respective pixels P (1)~P (N) being not electrically connected to the gates of the transistors M2 can be designed to be connected with together, the detailed circuit connection relationships can refer to the illustration of FIG. 7A. In addition, the voltage of the gate of the transistor M2 of each of the pixels P (1)~P (N) is reset to be a logic high level in the blanking time period of the frame period, so that the transistor M2 of the pixel is turned off, that is, performing a black insertion operation.

Figure 8:
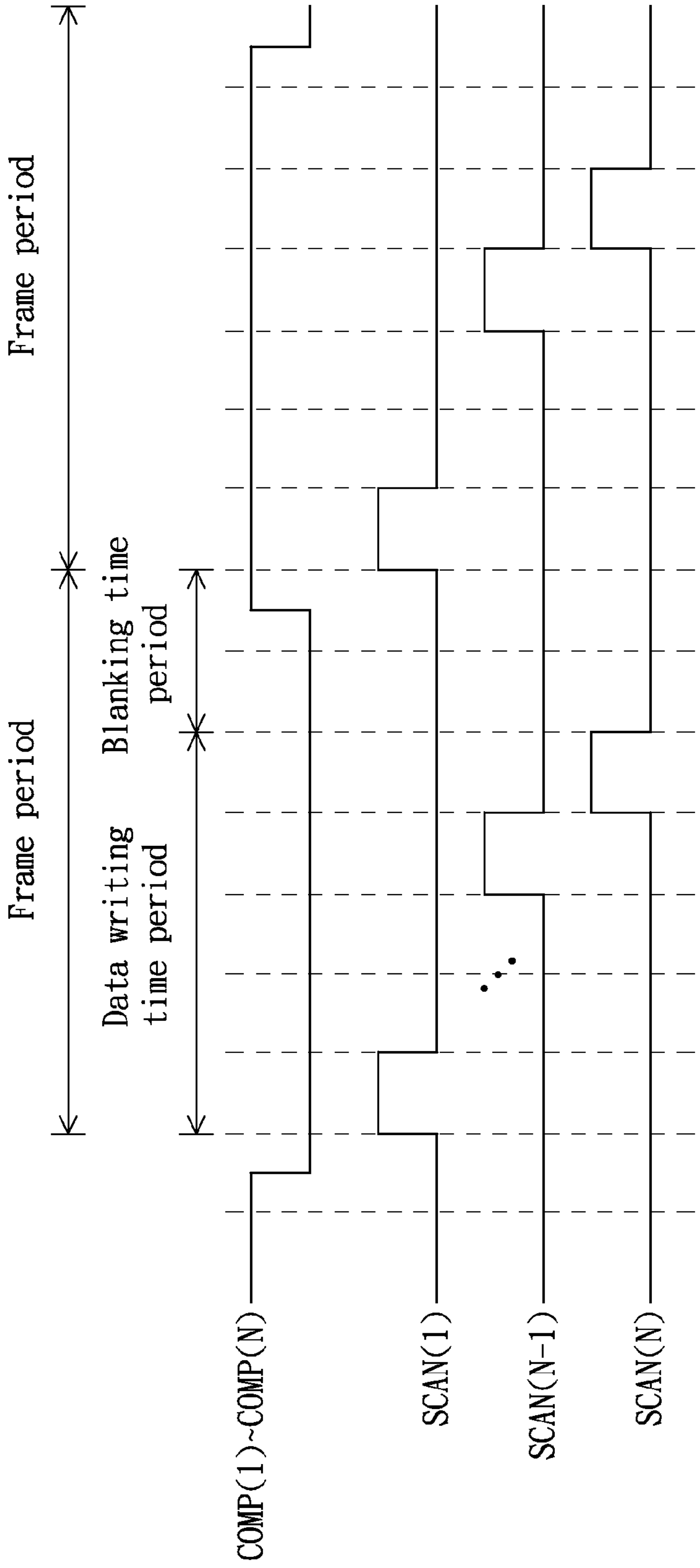
FIG. 8 shows timing diagrams of a sixth exemplary embodiment of resetting signals and scanning signals of a driving circuit of each pixel of FIG. 2.

Referring to FIG. 2 and FIG. 8 together, in two adjacent frame periods, each of the pixels P (1)~P (N) is reset during the corresponding one of the resetting signals COMP (1)~COMP (N) changes to be a logic high level in the blanking time period of a former frame period of the two adjacent frame periods, and further is reset during the corresponding one of the resetting signals COMP (1)~COMP (N) changes to be a logic low level in the blanking time period of a latter frame period of the two adjacent frame periods. In other words, in FIG. 8, the voltage of the gate of the transistor M2 of each of the pixels P (1)~P (N) is reset to be the logic high level and the logic low level respectively in the blanking time periods of the two adjacent frame periods, that is, performing frame black insertion and frame white insertion operations, so that each of the pixels P (1)~P (N) is reset to an extreme black display state such as gray scale 0 during the pixel is disabled to be written with the corresponding data signal in the former frame period and then reset to an extreme white display state such as gray scale 255 during the pixel is disabled to be written with the corresponding data signal in the latter frame period. In addition, in FIG. 8, the resetting signals COMP (1)~COMP (N) of the respective pixels P (1)~P (N) have the same waveform, therefore terminals of the capacitors Cst of the respective pixels P (1)~P (N) being not connected to the gates of the transistors M2 can be designed to be connected together. The detailed circuit connection relationships can also refer to the illustration of FIG. 7A.

Figure 9:
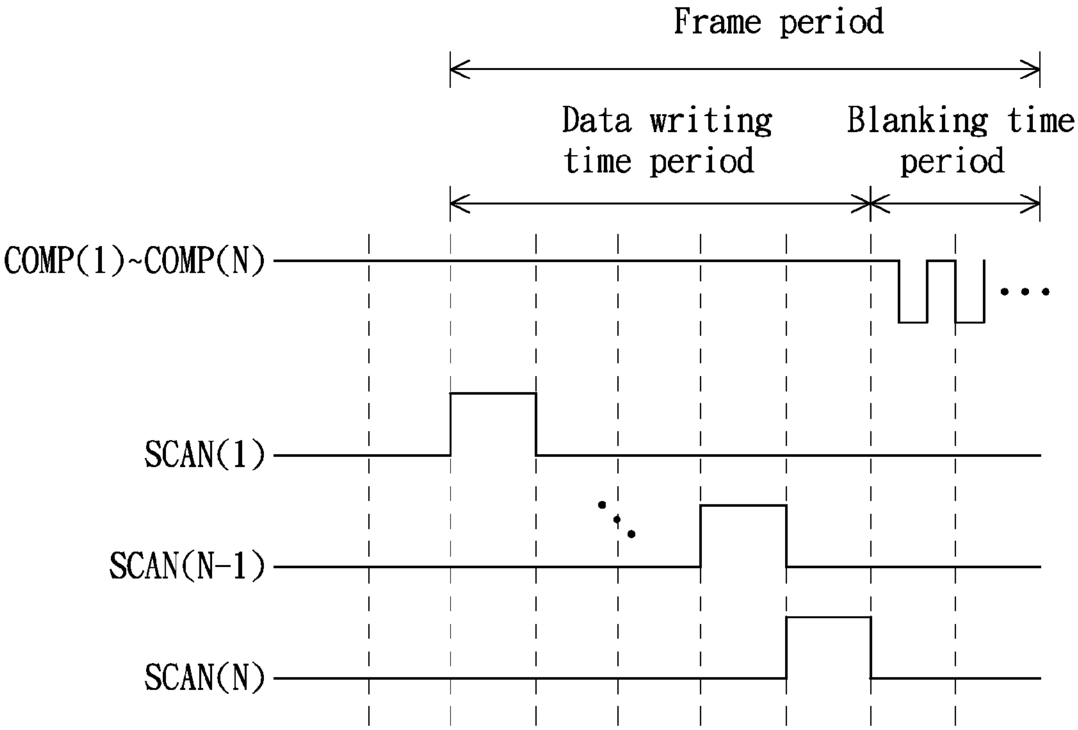
FIG. 9 shows timing diagrams of a seventh exemplary embodiment of resetting signals and scanning signals of a driving circuit of each pixel of FIG. 2.

Referring to FIG. 2 and FIG. 9 together, each of the pixels P (1)~P (N) is reset several/multiple times in the blanking time period of the frame period. In detail, in FIG. 9, the resetting signals COMP (1)~COMP (N) of the respective pixels P (1)~P (N) have the same waveform, therefore terminals of the capacitors Cst of the respective pixels P (1)~P (N) being not connected to the gates of the transistors M2 can be designed to be connected together. The detailed circuit connection relationships also can refer to the illustration of FIG. 7A. In addition, the voltage of the gate of the transistor M2 of each of the pixels P (1)~P (N) is reset several times because the corresponding one of the resetting signals COMP (1)~COMP (N) alternately changes to be one of a logic low level and a logic high level, performing a black insertion operation or a white insertion operation.

Figure 1A:
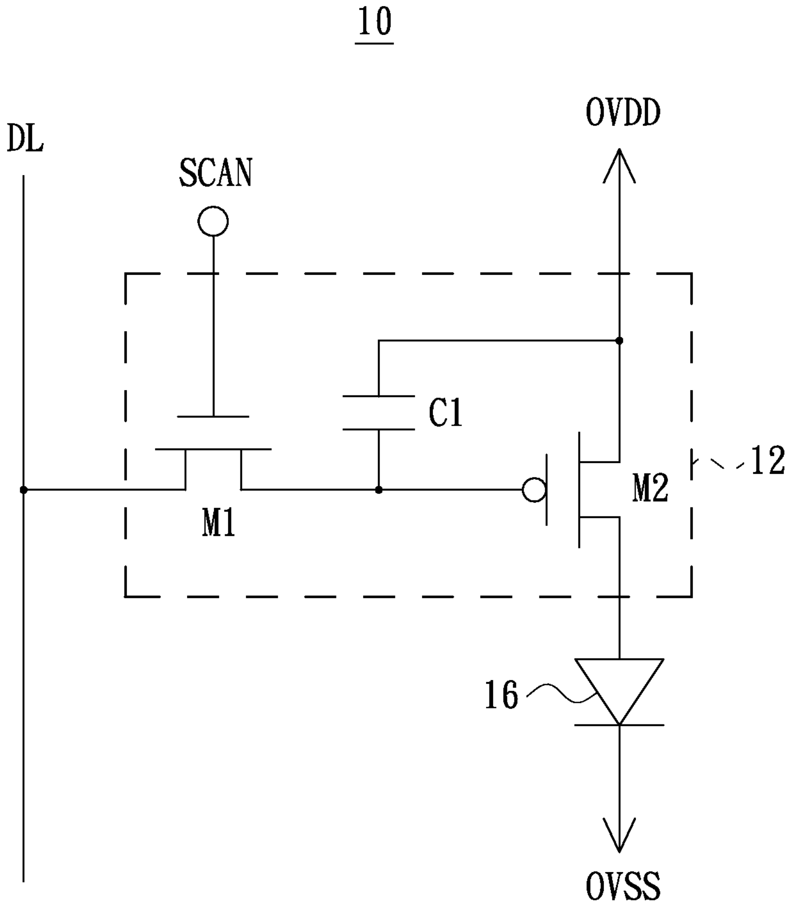
FIG. 1A (Related Art)
FIG. 1A shows a schematic view of a traditional pixel.
Figure 1B:
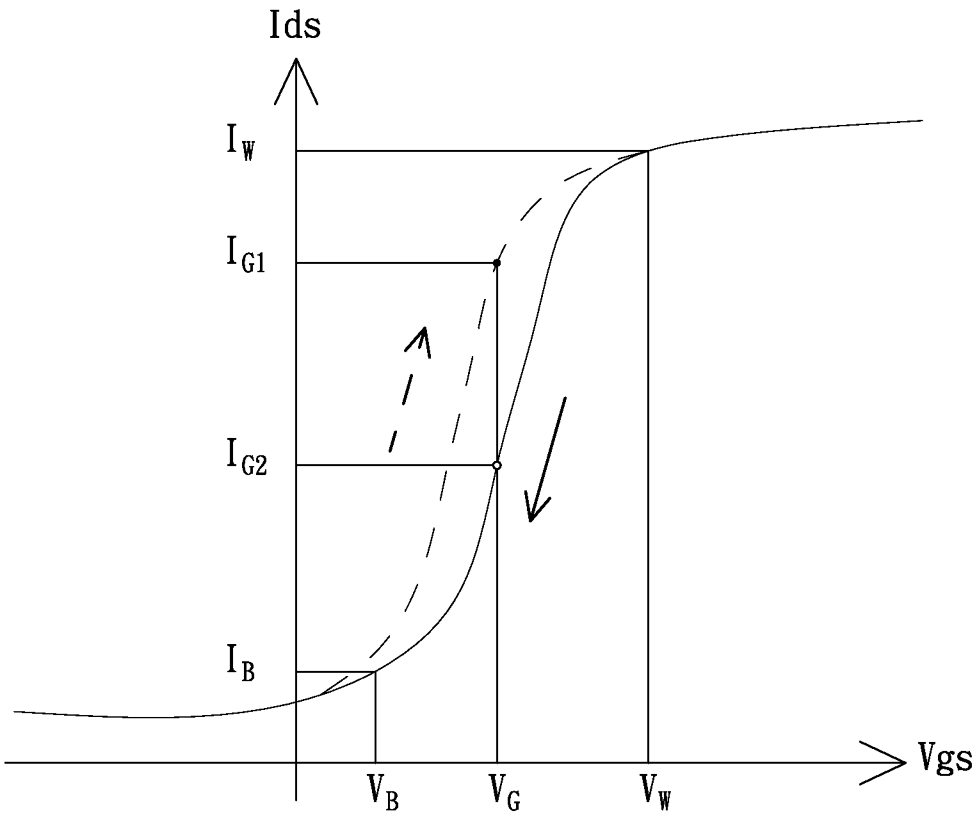
FIG. 1B (Related Art)
FIG. 1B shows a current-voltage characteristic curve diagram of a transistor having hysteresis effect in the prior art.

In the various embodiments of the present invention, each of the pixels P (1)~P (N) is performed one time or multiple times reset operation (e.g., black insertion and/or white insertion operation(s)) during the pixel is disabled to be written with the corresponding data signal, so that each of the pixels P (1)~P (N) is reset to an extreme display state (e.g., extreme black or extreme white) during the pixel is disabled to be written with the corresponding data signal. Accordingly, when each of the pixels P (1)~P (N) is written with the corresponding data signal, a current correspondingly generated and flowing through the OLED (i.e., generally corresponding to the drain-source current of the transistor M2) changes only along a single voltage-current characteristic curve represented by the "S" shaped dotted line or the "S" shaped solid line as shown in FIG. 1B, thereby compensating the influence of inherent hysteresis effect of the transistor M2.

Figure 10:
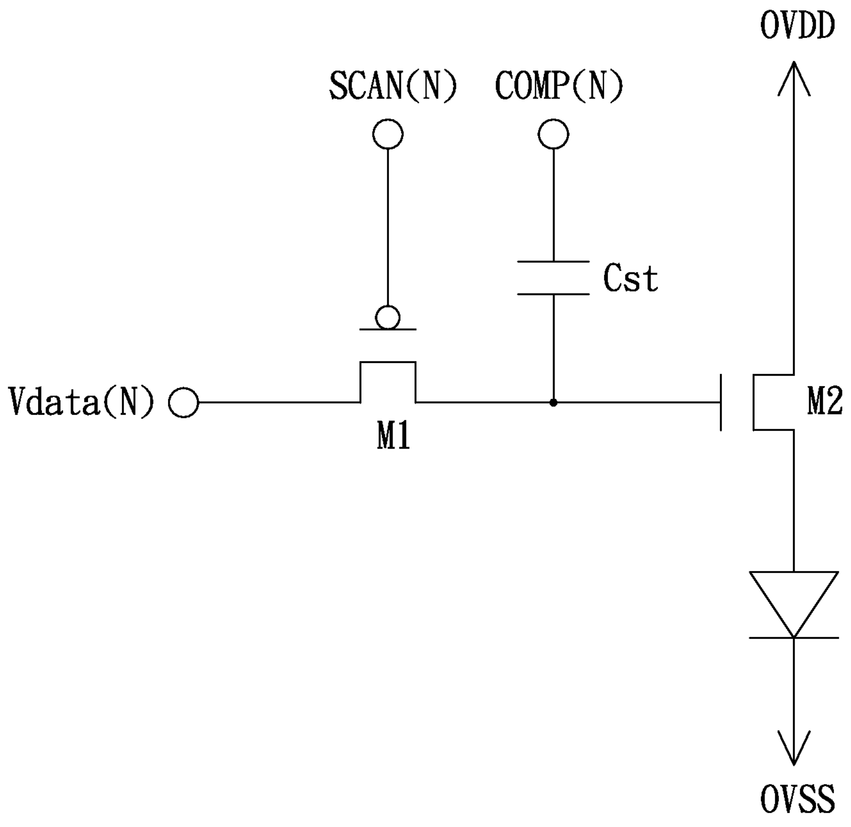
FIG. 10 shows a schematic view of another exemplary embodiment of a pixel.
Figure 11:
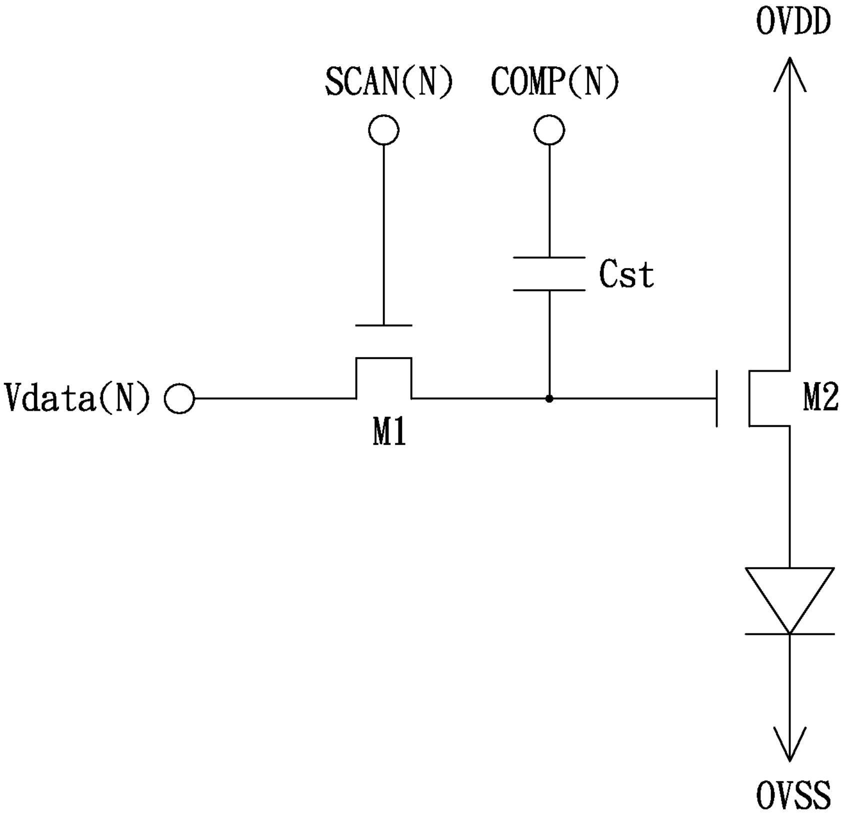
FIG. 11 shows a schematic view of still another exemplary embodiment of a pixel.
Figure 12:
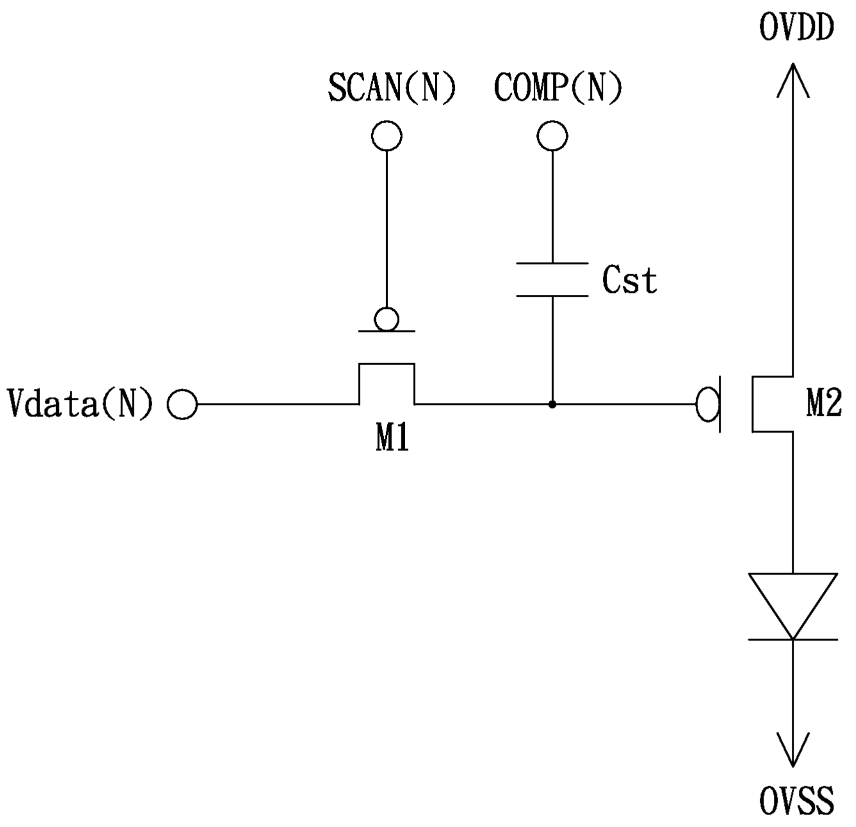
FIG. 12 shows a schematic view of even still another exemplary embodiment of a pixel.

In addition, it is understood to the skilled person in the art that, the transistors M1 and M2 associated with the above-mentioned embodiments of the present invention are not limited to the combination of respectively being N-type and P-type, they can be other types of combinations for example as shown in FIGS. 10 through 12.

In detail, in one embodiment as shown in FIG. 10, the transistor M1 is a P-type transistor and the transistor M2 is an N-type transistor, and thus conductive types of the transistors M1 and M2 are different from each other. In another embodiment as shown in FIG. 11, both the transistors M1 and M2 are N-type transistors, and thus the conductive types of the transistors M1 and M2 are the same. In still another embodiment as shown in FIG. 12, both the transistors M1 and M2 are P-type transistors, and the conductive types of the transistors M1 and M2 are the same.

In summary, in various embodiments of the present invention, the periodically varied resetting signal is provided and then coupled into the driving circuit of a pixel through capacitive coupling during the transistor M1 is turned off (i.e., generally during the pixel is disabled to be written with data signal to perform a rest operation(s) for black insertion and/or white insertion), therefore a current of the switch such as the transistor M2 electronically coupled to the current-driven device (e.g., OLED) of the driving circuit rises or falls only along a single current-voltage characteristic curve (IV curve) when various different data signals are written into the pixel, thereby compensating the influence of the inherent hysteresis effect of the transistor. Furthermore, when such the driving circuit is used in the pixels of the display device, the issue of image retention in prior art can be effectively suppressed, thereby improving the display quality.

In addition, any person familiar with the art can revise the display device and the driving circuit provided in the above-mentioned embodiments of the present invention, such as interchanging electrical connection relationships of the source and drain of each transistor, using other type of LED as the current-driven device and/or appropriately changing the timings of the resetting signals, etc.

Although the invention has been implemented in order to better expose the above cases, however, it's not to limit the invention, any person familiar with the art, without from the spirit and scope of the invention, when the changes can be made with a little polish, so this When the scope of protection of invention, as the scope of the attached patent application, whichever is defined.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A display device comprising a plurality of pixels, each of the plurality of pixels comprising:

a light emitting diode (LED) comprising a first terminal and a second terminal, wherein the first terminal of the LED is electrically coupled to a first preset voltage, and a driving circuit, comprising:

a first switch comprising a first passage terminal, a second passage terminal and a control terminal, wherein the first passage terminal of the first switch is electrically coupled to receive a data signal, and the control terminal of the first switch is electrically coupled to receive a scanning signal to determine whether the data signal is allowed to be transferred from the first passage terminal of the first switch to the second passage terminal of the first switch;

a second switch comprising a first passage terminal, a second passage terminal and a control terminal, wherein the first passage terminal of the second switch is electrically coupled to the second terminal of the LED, the second passage terminal of the second switch is electrically coupled to a second preset voltage, and the control terminal of the second switch is electrically coupled to the second passage terminal of the first switch to receive the data signal; and a capacitor electrically coupled between a periodically varied resetting signal and the control terminal of the second switch;

wherein a voltage of the control terminal of the second switch is periodically reset by the resetting signal to a first reset voltage level higher than a voltage level of the data signal during each frame period or to a second reset voltage level lower than the voltage level of the data signal during each frame period before the first switch is turned on during each frame period.

2. The display device as claimed in claim 1, wherein the plurality of pixels respectively are written with the data signals during being sequentially enabled by the respective scanning signals in a frequency period, and in each adjacent two of the plurality of pixels, the voltage of the control terminal of the second switch of a latterly enabled pixel is reset during a formerly enabled pixel being written with the data signal.

3. The display device as claimed in claim 2, wherein the frequency period comprises a data writing time period and a blanking time period, each of the plurality of pixels is enabled by the scanning signal in the data writing time period, and the voltage of the control terminal of the second switch of each of the plurality of pixels is reset in the blanking time period.

4. The display device as claimed in claim 3, wherein in each adjacent two of the plurality of pixels, the voltage of the control terminal of the second switch of the latterly enabled pixel is reset to a first voltage level during the formerly enabled pixel being written with the data signal, and the voltage of the control terminal of the second switch of each of the plurality of pixels is reset to a second voltage level in the blanking time period; the first voltage level is the same as the second voltage level.

5. The display device as claimed in claim 3, wherein in each adjacent two of the plurality of pixels, the voltage of the control terminal of the second switch of the latterly enabled pixel is reset to a first voltage level during the formerly enabled pixel being written with the data signal, and the voltage of the control terminal of the second switch of each of the plurality of pixels is reset to a second voltage level in the blanking time period; the first voltage level is different from the second voltage level.

6. The display device as claimed in claim 5, wherein the first voltage level is lower than the second voltage level.

7. The display device as claimed in claim 5, wherein the first voltage level is higher than the second voltage level.

8. The display device as claimed in claim 1, wherein the plurality of pixels respectively are written with the data signals during being sequentially enabled by the respective scanning signals in a frequency period, the frequency period comprises a data writing time period and a blanking time period, each of the plurality of pixels is reset by the scanning signal in the data writing time period, and the voltage of the control terminal of the second switch of each of the plurality of pixels is reset in the blanking time period.

9. The display device as claimed in claim 8, wherein in each two adjacent the frequency periods, the voltage of the control terminal of the second switch of each of the plurality of pixels is reset to a first voltage level in the blanking period of a first frequency period of the two adjacent frequency periods, and the voltage of the control terminal of the second switch of each of the plurality of pixels is reset to a second voltage level in the blanking time period of a second frequency period of the two adjacent frequency periods; the first voltage level is different from the second voltage level.

10. The display device as claimed in claim 8, wherein the voltage of the control terminal of the second switch of each of the plurality of pixels is reset multiple times in the blanking time period of the frequency period.

11. The display device as claimed in claim 1, wherein the voltage of the control terminal of the second switch is reset to turn off the second switch.

12. The display device as claimed in claim 1, wherein the first reset voltage level is a logic high level and the second reset voltage level is a logic low level.

13. A displaying method adapted to a display device, the display device comprising a plurality of pixels, each of the plurality of pixels comprising a light emitting diode (LED), a switch module, and a capacitor, wherein a first terminal of the LED is electrically coupled to a first preset voltage, the switch module is electrically coupled to a data signal, a second terminal of the LED, and a second preset voltage, the switch module is for determining whether a current is allowed to flow through the LED and setting a value of the current flowing through the LED according to the data signal, a terminal of the capacitor is electrically coupled to the switch module and whereby forming a connection node, the displaying method comprising:

in a frequency period of the display device, sequentially scanning the plurality of pixels to enable the switch module of each of the plurality of pixels and thereby writing the data signal into the pixel; and before the switch module of each of the plurality of pixels is enabled, coupling a periodically varied resetting signal into the switch module of the pixel through the capacitor of the pixel to periodically reset a voltage of the connection node of the pixel to insert a black state of the LED or to insert a white state of the LED.

14. The displaying method as claimed in claim 13, wherein in each adjacent two of the plurality of pixels, the voltage of the connection node of the pixel of latterly written with the data signal is reset during the pixel of formerly written with the data signal being written with the data signal.

15. The displaying method as claimed in claim 14, wherein the frequency period comprises a data writing time period and a blanking time period, the switch module of each of the plurality of pixels is enabled in the data writing time period, and the voltage of the connection node of each of the plurality of pixels is reset in the blanking time period.

16. The displaying method as claimed in claim 15, wherein in each adjacent two of the plurality of pixels, the voltage of the connection node of the pixel of latterly written with the data signal is reset to a first voltage level during the pixel of formerly written with the data signal being written with the data signal, and the voltage of the connection node of each of the plurality of pixels is reset to a second voltage level in the blanking time period; the first voltage level is the same as the second voltage level.

17. The displaying method as claimed in claim 15, wherein in each adjacent two of the plurality of pixels, the voltage of the connection node of the pixel of latterly written with the data signal is reset to a first voltage level during the pixel of formerly written with the data signal being written with the data signal, and the voltage of the connection node of each of the plurality of pixels is reset to a second voltage level in the blanking time period; the first voltage level is different from the second voltage level.

18. The displaying method as claimed in claim 17, wherein the voltage of the connection node of the pixel is reset to turn off the switch module.

19. The displaying method as claimed in claim 17, wherein the first voltage level is higher or lower than the second voltage level.

20. The displaying method as claimed in claim 13, wherein the frequency period comprises a data writing time period and a blanking time period, the switch module of each of the plurality of pixels is enabled in the data writing time period, and the voltage of the connection node of each of the plurality of pixels is reset in the blanking time period.

21. The displaying method as claimed in claim 20, wherein in each two adjacent the frequency periods, the voltage of the connection node of each of the plurality of pixels is reset to a first voltage level in the blanking period of a first frequency period of the two adjacent frequency periods, and the voltage of the connection node of each of the plurality of pixels is reset to a second voltage level in the blanking time period of a second frequency period of the two adjacent frequency periods; the first voltage level is different from the second voltage level.

22. The displaying method as claimed in claim 20, wherein the voltage of the connection node of each of the plurality of pixels is reset multiple times in the blanking time period of the frequency period.

23. A driving circuit adapted to drive a current-driven device, wherein the current-driven device comprises a first terminal and a second terminal, the first terminal of the current-driven device is electrically coupled to a first preset voltage, the driving circuit comprising:

a switch module electrically coupled to a data signal, the second terminal of the current-driven device and a second preset voltage, the switch module being for determining whether a current is allowed to flow through the current-driven device and setting a value of the current flowing through the current-driven device according to the data signal; and a capacitor electrically coupled between a periodically changed resetting signal and the switch module and for coupling the resetting signal into the switch module to periodically reset a voltage at a connection node between the capacitor and the switch module to a first reset voltage level higher than a voltage level of the data signal during each frame period or to a second reset voltage level lower than the voltage level of the data signal during each frame period before the switch module is enabled during each frame period.

24. The driving circuit as claimed in claim 23, wherein the switch module has a plurality of switches, each of the plurality of switches comprises a control terminal, a first passage terminal and a second passage terminal, the switch module comprises:

a first switch, wherein the first passage terminal of the first switch is electrically coupled to receive the data signal, the control terminal of the first switch is electrically coupled to receive a scanning signal to determine whether the data signal is allowed to be transferred from the first passage terminal of the first switch to the second passage terminal of the first switch; and a second switch, wherein the first passage terminal of the second switch is electrically coupled to the second terminal of the LED, the second passage terminal of the second switch is electrically coupled to the second preset voltage, and the control terminal of the second switch is electrically coupled to the second passage terminal of the first switch to receive the data signal;

wherein the capacitor is electrically coupled to the periodically changed resetting signal and the control terminal of the second switch.

25. The driving circuit as claimed in claim 24, wherein the voltage at the connection node between the capacitor and the switch module is reset to turn off the second switch.

26. The driving method as claimed in claim 24, wherein the first reset voltage level is a logic high level and the second reset voltage level is a logic low level.

* * * * *